June 28, 1927.
T. B. SLATE
1,634,089
CARBONATING APPARATUS
Filed Jan. 12, 1924
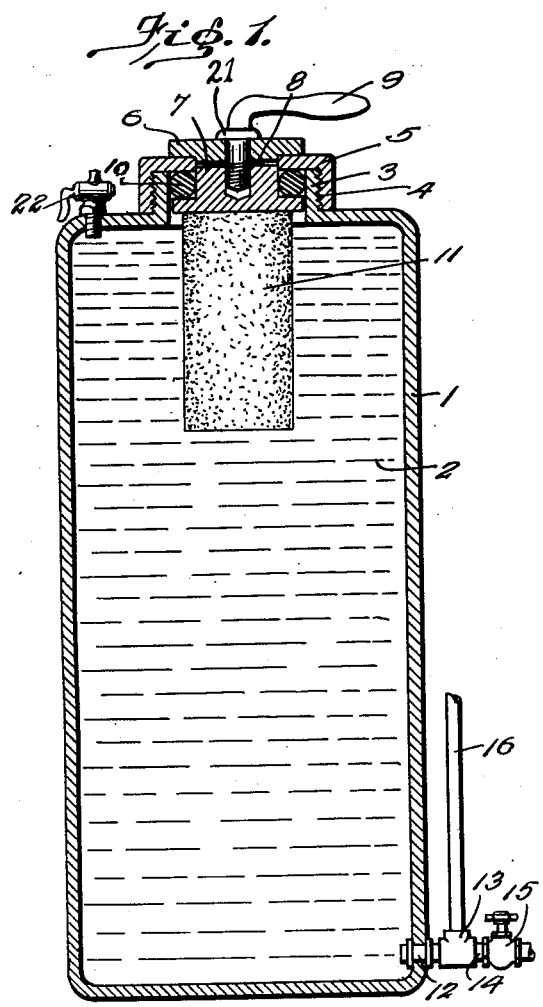
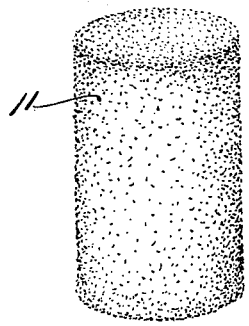
INVENTOR.
Thomas B. Slate,
BY
Lester L. Sargent.
ATTORNEY.

Patented June 28, 1927.

1,634,089

UNITED STATES PATENT OFFICE.

THOMAS B. SLATE, OF NEW YORK, N. Y., ASSIGNOR, BY MESNE ASSIGNMENTS, TO INTERNATIONAL PATENTS FISCAL CORPORATION, OF NEW YORK, N. Y., A CORPORATION OF NEW YORK.

CARBONATING APPARATUS.

Application filed January 12, 1924. Serial No. 685,890.

The object of my invention is to provide a novel carbonating apparatus, adapted for using carbon dioxide snow for simultaneously carbonating and refrigerating a liquid; and to provide the novel process for simultaneously carbonating and refrigerating a liquid by using a body of carbon dioxide snow within a sealed container and in or in communication with the liquid in the container; to provide a novel and efficient sealing air tight cover for a carbonating apparatus of the kind disclosed; and to provide the novel combination and arrangement of parts described and illustrated in the accompanying drawings, in which—

Figure 1 is a vertical longitudinal section of my invention;

Fig. 2 is a perspective view of element 11.

Like numerals designate like parts or elements in each of the several views.

I provide a suitable tank or container 1, opening into which is a suitable inlet and outlet pipe 12 for admitting and withdrawing the liquid to be carbonated and refrigerated, this liquid ordinarily being water. Pipe 12 is provided with a T-pipe fitting 13, connected with the inlet or supply pipe 14 and to the outlet pipe 16 extending to the fountain or wherever the carbonated liquid is to be used.

The container 1 is provided with an exteriorly threaded neck 3, with which the correspondingly threaded trap 5 meshes, as at 4. I provide a washer 6 seating on cap 5. I also provide a screw threaded handle 9, having a flange 21 resting on the top of washer 6 and having a screw threaded end engaging in the threaded socket 8 of the plug 7, there also being a rubber ring 10 interposed between cap 5 and the annularly flanged plug 7, as shown in Figs. 1 and 2. Ring 10 functions as a sealing ring when flattened by reason of pressure exerted by the plug 7. The carbonization and refrigeration of the liquid contents 2 of tank 1 is produced by a suitable, preferably cylindrical, body or brick of carbon dioxide snow, designated 11, and inserted into the container through neck 3.

The device illustrated in Figure 1 operates as follows: The stop cock 22 (of conventional type) is first opened to relieve the tank of any pressure there might be in it. The sealing plug 7 is then released by turning lever 9 to the left until the pressure on rubber ring 10 is released. The sealing device is removed by unscrewing cap 5, which may be either continuously or intermittently threaded, the neck 3 of the container being threaded in a manner corresponding with the cap 5. Valve 15 is opened, allowing the liquid to be carbonated to flow into the container 1 through conduits 14 and 12. The container is filled to within a fraction of the top with the liquid to be carbonated and the body or cylinder of carbon dioxide snow 11 is inserted, through neck 3, into the liquid in which it floats, as shown, and the sealing device is replaced and the cap 5 screwed into sealing position. The stop cock 22 is then closed.

The brick of carbon dioxide being heavier than water ice will immediately settle to the bottom and the escaping gas therefrom passing through the water will absorb the melting carbon dioxide snow according to the amount of pressure it is under at the time. The weight of the brick or body 11 of carbon dioxide is predetermined to compare with the size of the container, so that a given pressure will be reached in the container by that amount of carbon dioxide snow. As soon as the sealing device is in place and stop cock closed, the contents of container 1 will be agitated, by any of the conventional types of agitators (not shown), while the melting carbon dioxide is building up the pressure in the tank or container. If it is desired to use a container of light weight material that would not carry a considerable factor of safety under the pressures required for sufficiently carbonating the liquid contents, a suitable safety valve of conventional type may be arranged on the container.

In this device the carbon dioxide is given up by the water as the water is drawn out through pipe 16, and continues to supply the pressure within the container to force the water (or other carbonated liquid) out through pipe 16. When the carbonated liquid is exhausted the operation is repeated by opening stop cock 22, relieving the tank of any remaining gas pressure.

Owing to the high pressure necesary to store and handle liquid carbon dioxide, it has been necessary heretofore to have very heavy steel tanks in which to store it, the weight of these tanks ordinarily being about four times the weight of the liquid carbon dioxide which they contained. It has therefore been necessary to handle a total of five times the weight of liquid carbon dioxide to be delivered in order to deliver this material from the factory to the consumer. And in order to keep the ratio of weights at even four to one, it has been necessary to make these tanks of a weight approximating 200 pounds to hold 50 pounds of carbon dioxide, thus making a total of 250 pounds to be handled—a very heavy article to be handled by one man in the process of delivery. The opening in the tank is necessarily small and the conventional tank tends to rust on the inside and become dirty and unsanitary. By converting the carbon dioxide to snow and compressing it into compact, preferably cylindrical bricks 11, it may be delivered very conveniently, with very little if any additional weight necessary to be delivered with it.

My invention includes not only the carbonating apparatus disclosed but the method of simultaneously refrigerating and carbonating a liquid by placing a body of carbon dioxide snow in or in communication with a closed container nearly filled with the liquid to be carbonated and refrigerated and tightly sealing this container while the snow melts or reverts to its normal gaseous state, thereby producing the desired carbonating and refrigerating effect, reducing the temperature of the liquid to the extent of the difference in the carbonating pressure and the pressure of liquid carbon dioxide.

The carbon dioxide snow when compressed has the appearance of and a greater density than ice. Throughout the specification and claims the term "carbon dioxide snow" or "snow" is to be construed as referring to the product whether in its porous or compressed form.

What I claim is:

1. In a carbonating apparatus, the combination of a container formed with an opening surrounded by a neck affording an inner bearing surface, an airtight closure device adjustably secured to the neck of the container and having an inwardly projecting annular flange, said closure device including spaced members and a resilient ring interposed between the spaced members of said closure, the outer of said spaced members bearing upon the outer face of said annular flange and said resilient ring bearing on the inner face of said annular flange, whereby to provide a closure device adapted to withstand a high pressure from within the container to permit of carbonating the contents of the container by means of carbon dioxide snow.

2. In a carbonating apparatus, the combination of a container, means in connection with the lower end of the container for admitting a liquid to and withdrawing it from the container formed with an opening surrounded by a neck affording an inner bearing surface, an airtight closure device detachably secured to the neck of the container and having an inwardly projecting annular flange, said closure device including spaced members, a resilient ring interposed between said members and bearing outwardly against the inner surface of said neck and upwardly against the lower surface of said flange and adapted to effect an airtight seal when pressure is exerted on the closure device from within the container, and a handle attached to one of the members of the closure device to permit of conveniently applying it to and removing it from the container, whereby to provide an apparatus adapted for use in carbonating a liquid with carbon dioxide snow.

3. In a device of the class described, the combination of a container, means in communication with the lower end of the container for admitting a liquid to and withdrawing it from the container, and an airtight closure device detachably secured to the neck of the container, said closure device including a cap detachably engaging the neck of the container, said cap having a flange projecting inwardly in the opening in the neck of the container, a cylindrical plug having an annular flange affording a peripheral recess, the latter flange being of a diameter substantially equal to that of the neck of the container, a resilient ring in the recess, interposed between the inner face of the flange of the cap and the flange of the plug, and a clamping member positioned over the cap and plug, including a screw, a handle having its end in screw-threaded engagement with the plug and having a flange engaging the top of the cap.

4. In a carbonating apparatus, the combination of a container, means in connection with the lower end of the container for admitting a liquid to and withdrawing it from the container formed with an opening surrounded by a neck affording an inner bearing surface, an air-tight closure device detachably secured to the neck of the container and having an inwardly projecting annular flange, said closure device including spaced members, a resilient ring interposed between said members and bearing outwardly against said neck and upwardly against the lower face of said flange to effect an air-tight seal when pressure is exerted on the closure device from within the container, and a handle attached to one of the members of the closure device to permit of conveniently applying it to and removing it from the container, said handle including means for drawing said spaced members toward each other and compressing the resilient ring and forcing same outward against the neck of the container to effect the air-tight sealing.

THOMAS B. SLATE.